(12) United States Patent
Lee et al.

(10) Patent No.: US 12,212,017 B2
(45) Date of Patent: Jan. 28, 2025

(54) SEPARATOR FOR LITHIUM SECONDARY BATTERY AND LITHIUM SECONDARY BATTERY COMPRISING SAME

(71) Applicant: Samsung SDI Co., Ltd., Yongin-si (KR)

(72) Inventors: Jungyoon Lee, Yongin-si (KR); Gain Kim, Yongin-si (KR); Yongkyoung Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 122 days.

(21) Appl. No.: 16/969,176

(22) PCT Filed: Jan. 29, 2019

(86) PCT No.: PCT/KR2019/001216
§ 371 (c)(1),
(2) Date: Aug. 11, 2020

(87) PCT Pub. No.: WO2019/156410
PCT Pub. Date: Aug. 15, 2019

(65) Prior Publication Data
US 2020/0403205 A1    Dec. 24, 2020

(30) Foreign Application Priority Data

Feb. 12, 2018    (KR) .................. 10-2018-0017065

(51) Int. Cl.
*H01M 50/44*    (2021.01)
*H01M 4/62*    (2006.01)
(Continued)

(52) U.S. Cl.
CPC ........... *H01M 50/44* (2021.01); *H01M 4/622* (2013.01); *H01M 10/052* (2013.01);
(Continued)

(58) Field of Classification Search
CPC .. H01M 50/449; H01M 50/411; H01M 50/44; H01M 4/622
See application file for complete search history.

(56) References Cited

U.S. PATENT DOCUMENTS 8,405,957 B2    3/2013   Katayama et al.
9,812,688 B2   11/2017   Park et al.
(Continued)

FOREIGN PATENT DOCUMENTS

CN    107534117 A    1/2018
EP    2 669 970 A1   12/2013
(Continued)

OTHER PUBLICATIONS

Machine translation of KR-20160079623-A (Year: 2016).*
(Continued)

*Primary Examiner* — Jonathan G Leong
*Assistant Examiner* — Drew C Newman
(74) *Attorney, Agent, or Firm* — Knobbe, Martens, Olson & Bear, LLP

(57) ABSTRACT

Disclosed are a separator for a lithium secondary battery and a lithium secondary battery comprising same. The separator for a lithium secondary battery comprises: a porous substrate; and a coating layer disposed on at least one side of the porous substrate, wherein the coating layer contains heat-resistant organic particles, an organic heat-resistant binder, and an organic adhesive binder, wherein the heat-resistant organic particles have a thermal decomposition temperature of 150° C. or higher and a particle diameter of 100 nm to 300 nm, the organic heat-resistant binder is a first organic material having a glass transition temperature of 130° C. to 200° C., the organic adhesive binder is a second organic material having a glass transition temperature of −40° C. or
(Continued)

lower, and the mixing weight ratio of the organic heat-resistant binder and the organic adhesive binder is 7:3 to 9:1.

6 Claims, 4 Drawing Sheets

(51) Int. Cl.
| | |
|---|---|
| *H01M 10/052* | (2010.01) |
| *H01M 50/414* | (2021.01) |
| *H01M 50/417* | (2021.01) |
| *H01M 50/42* | (2021.01) |
| *H01M 50/443* | (2021.01) |
| *H01M 50/457* | (2021.01) |
| *H01M 50/489* | (2021.01) |

(52) U.S. Cl.
CPC ....... *H01M 50/414* (2021.01); *H01M 50/417* (2021.01); *H01M 50/42* (2021.01); *H01M 50/443* (2021.01); *H01M 50/457* (2021.01); *H01M 50/489* (2021.01)

(56) References Cited

U.S. PATENT DOCUMENTS

| | | | |
|---|---|---|---|
| 9,905,824 B2 | 2/2018 | Ruy et al. | |
| 9,911,959 B2 | 3/2018 | Murata et al. | |
| 10,333,126 B2 | 6/2019 | Joo et al. | |
| 10,608,225 B2 | 3/2020 | Kim et al. | |
| 2014/0295170 A1* | 10/2014 | Kim | H01M 50/451 |
| | | | 428/315.5 |
| 2014/0308565 A1 | 10/2014 | Lee et al. | |
| 2015/0311490 A1 | 10/2015 | Murase et al. | |
| 2016/0149186 A1* | 5/2016 | Kim | H01M 50/429 |
| | | | 429/144 |
| 2016/0149187 A1* | 5/2016 | Cho | H01M 50/446 |
| | | | 429/144 |
| 2016/0293999 A1* | 10/2016 | Kim | H01M 4/0404 |
| 2018/0327639 A1* | 11/2018 | Tanaka | H01M 4/622 |

FOREIGN PATENT DOCUMENTS

| | | | | |
|---|---|---|---|---|
| JP | 2014-041818 | | 3/2014 | |
| JP | 2017-140840 A | | 8/2017 | |
| KR | 2008-0073371 A | | 8/2008 | |
| KR | 2014-0091107 A | | 7/2014 | |
| KR | 2014-0112384 A | | 9/2014 | |
| KR | 2015-0001148 A | | 1/2015 | |
| KR | 2015-0070979 A | | 6/2015 | |
| KR | 2015-0099648 A | | 9/2015 | |
| KR | 10-2016-0038599 | | 4/2016 | |
| KR | 20160079623 A * | | 7/2016 | ........... H01M 4/622 |
| KR | 10-2017-0129642 | | 11/2017 | |
| KR | 10-2018-0003177 | | 1/2018 | |
| WO | WO-2010134501 A1 * | | 11/2010 | ........... H01M 2/166 |
| WO | WO 14/104687 A1 | | 7/2014 | |
| WO | WO 2014/168392 | | 10/2014 | |
| WO | WO 2015-076571 | | 5/2015 | |
| WO | WO-2015084053 A1 * | | 6/2015 | .......... H01M 10/052 |
| WO | WO-2017094250 A1 * | | 6/2017 | .............. C09J 11/08 |

OTHER PUBLICATIONS

Machine translation of WO-2015084053-A1 (Year: 2015).*
Machine translation of WO-2010134501-A1 (Year: 2010).*
Baldwin et al., May 2010, Battery Separator Characterization and Evaluation Procedures for NASA's Advanced Lithium-Ion Batteries, NASA/TM—2010-216099, 70 pp.
Fedelich et al., Jan. 2013, Thermal Analysis of Polymers: Application Handbook, Mettler-Toledo AG, 40 pp.
Malvern Instruments Worldwide, May 2, 2012, A Basic Guide to Particle Characterization, White Paper, 26 pp.
Extended European Search Report dated Oct. 14, 2021 in corresponding patent application No. 19751477.1, 12 pp.
International Search Report received in PCT/KR2019/001216 mailed May 9, 2019.
Notice of Non-Final Rejection dated Jun. 10, 2020 in Korean patent application No. 10-2018-0017065.
Notification of first office action dated Apr. 26, 2022 in corresponding Chinese patent application No. 201980012896.6, 18 pp.
Second Office Action issued Jan. 19, 2023 in corresponding Chinese application No. 201980012896.6, 18 pp.
Notification to Grant dated May 29, 2023 in corresponding Chinese patent application No. 201980012896.6, 2 pp.

* cited by examiner

SEPARATOR FOR LITHIUM SECONDARY BATTERY AND LITHIUM SECONDARY BATTERY COMPRISING SAME

CROSS-REFERENCE TO RELATED APPLICATIONS

This application is a national phase of PCT Application No. PCT/KR2019/001216, filed on Jan. 29, 2019, which claims priority to Korean Patent Application No. 10-2018-0017065 filed on Feb. 12, 2018, each of which is hereby incorporated by reference.

TECHNICAL FIELD

The present disclosure relates to a separator for a lithium secondary battery and a lithium secondary battery comprising the same.

BACKGROUND ART

As lithium secondary batteries have been gradually used in a wide variety of applications, there has been a strong demand for high-capacity, large-sized and extended cycle-life lithium secondary batteries. In order to manufacture such high-capacity, large-sized and long-life lithium secondary batteries, various methods for forming a coating layer to impart functionality to a porous substrate as a separator are being attempted.

A known method is to use a separator having an inorganic coating layer as the separator. The separator having an inorganic coating layer has good heat resistance but exhibits an unsatisfactory insulating property, resulting in poor battery characteristics, for example, in terms of a breakdown voltage characteristic, and thus there is a need for improved battery characteristics.

DESCRIPTION OF EMBODIMENTS

Technical Problem

An aspect is to provide a separator for a lithium secondary battery, which has excellent heat resistance and an improved breakdown voltage characteristic.

Another aspect is to provide a lithium secondary battery having improved cell performance by including the separator for a lithium secondary battery.

Technical Solution to Problem

According to an aspect, provided is a separator for a lithium secondary battery including
a porous substrate and a coating layer disposed on at least one side of the porous substrate, wherein
the coating layer contains heat-resistant organic particles, an organic heat-resistant binder, and an organic adhesive binder, wherein
the heat-resistant organic particles have a thermal decomposition temperature of 150° C. or higher and a particle diameter of 100 nm to 300 nm, the organic heat-resistant binder is a first organic material having a glass transition temperature of 130° C. to 200° C., the organic adhesive binder is a second organic material having a glass transition temperature of −40° C. or lower, and the mixing weight ratio of the organic heat-resistant binder and the organic adhesive binder is 7:3 to 9:1.

According to another aspect, provided is a lithium secondary battery including a positive electrode, a negative electrode, and the separator interposed therebetween.

Advantageous Effects of Disclosure

The separator according to an embodiment may have an improved insulating property while securing thermal stability. By employing the separator, a lithium secondary battery having improved a breakdown voltage characteristic may be manufactured.

EXPLANATION OF REFERENCE NUMERALS DESIGNATING THE MAJOR ELEMENTS OF THE DRAWINGS

20 . . . Lithium Secondary Battery
22 . . . Negative Electrode
23 . . . Positive Electrode
24 . . . Separator
25 . . . Battery Case
26 . . . Cap Assembly

MODE OF DISCLOSURE

Hereinafter, a separator for a lithium secondary battery and a lithium secondary battery comprising the same will be described in greater detail.

The separator for a lithium secondary battery includes a porous substrate and a coating layer disposed on at least one side of the porous substrate. The coating layer contains heat-resistant organic particles, an organic heat-resistant binder, and an organic adhesive binder, wherein the heat-resistant organic particles have a thermal decomposition temperature of 150° C. or higher and a particle diameter of 100 nm to 300 nm (0.1 μm to 0.3 μm), the organic heat-resistant binder is a first organic material having a glass transition temperature of 130° C. to 200° C., and the organic adhesive binder is a second organic material having a glass transition temperature of −40° C. or lower.

The mixing weight ratio of the organic heat-resistant binder and the organic adhesive binder is 7:3 to 9:1. When the amounts of the organic heat-resistant binder and the organic adhesive binder are in the range stated above, the coating layer may have a high binding force with respect to the porous substrate, excellent heat resistance and an improved breakdown voltage characteristic.

A separator including a coating layer containing an inorganic material on the porous substrate is mainly used as a high-capacity separator for a lithium secondary battery. Although the separator has excellent heat resistance, the manufacturing process thereof is complicated because an inorganic material dispersion process should be performed in forming the coating layer containing the inorganic material, and the breakdown voltage characteristic of the separator is still unsatisfactory. Accordingly, there is much room for improvement.

Thus, in order to solve the above-mentioned problems, a separator is provided, which uses a coating layer made of an organic material containing heat-resistant organic particles, an organic adhesive binder and an organic heat-resistant binder. By controlling the mixing ratio of the organic heat-resistant binder and the organic adhesive binder in the coating layer to be in a predetermined range, the breakdown voltage characteristic of the coating layer may be improved while securing the same level of heat resistance, compared with the heat resistance of the separator including a coating layer containing an inorganic material, and the manufacturing process of the separator may be simplified.

Hereinafter, a separator for a lithium secondary battery according to an embodiment will be described with reference to FIG. 1.

Figure 1:
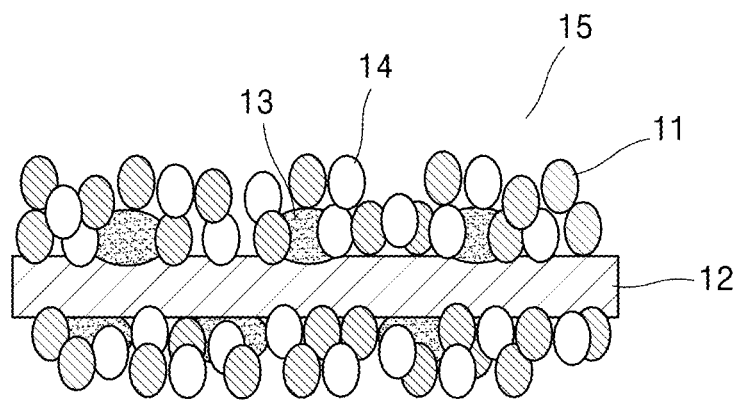
FIG. 1 schematically shows a stacked structure of a separator according to an embodiment.

Referring to FIG. 1, the separator for a lithium secondary battery has a structure in which a coating layer 15 is disposed on both sides of a porous substrate 12. The coating layer 15 contains heat-resistant organic particles 11, an organic adhesive binder 13, and an organic heat-resistant binder 14. The organic adhesive binder 13 contributes to exhibition of a heat resisting effect while the coating layer 15 maintains an excellent binding effect with respect to the porous substrate 12. In addition, the organic heat-resistant binder 14 may improve the heat resistance and breakdown voltage characteristic of the separator.

A glass transition temperature of the heat-resistant organic particles 11 may be 150° C. or higher, for example, 150° C. to 300° C., or 250° C. to 300° C.

A particle diameter of the heat-resistant organic particles 11 ranges from 100 to 300 nm (that is, in a 0.1 to 0.3 μm range). If the particle diameter of the heat-resistant organic particles 11 is less than 100 nm, the adhesive force of the separator with respect to the porous substrate 12 may be weakened, thereby undesirably lowering the battery stability. If the particle diameter of the heat-resistant organic particles 11 exceeds 300 nm, the coating layer 15 makes packing difficult to be effectively performed, thereby making it difficult to achieve desired thermal stability. In the present disclosure, the term "diameter" is an average particle diameter (D50).

If the heat-resistant organic particles 11 have the same particle diameter as shown in FIG. 1, packing may be maximized in the coating layer 15 to further improve heat resistance of the separator, and use of the heat-resistant organic particles 11 having the particle diameter within the range stated herein may provide the coating layer 15 having a reduced moisture content and an excellent insulating property. In addition, a polymer having a high glass transition temperature is used as the organic heat-resistant binder 14, and the polymer contained in the coating layer 15 may further improve the heat resistance of the separator.

The coating layer 15 of the separator according to an embodiment can secure heat resistance compared to a coating layer containing an inorganic material. The coating layer 15 of the separator, containing only an organic material, may be identified by a variety of methods including, for example, inductively coupled plasma (ICP) analysis.

The separator according to an embodiment has a reduced content of iron (Fe) as an impurity, compared to the separator including the coating layer containing an inorganic material, and the iron (Fe) content thereof may be, for example, 0.01 to 3 ppm or 3 to 5 mg/kg. The iron (Fe) content may be measured through inductively coupled plasma (ICP) analysis. In the separator according to an embodiment, the coating layer includes an organic material, and thus the iron (Fe) content is very small, as described above. As such, the separator containing an extremely small content of iron (Fe) has very good heat resistance.

In the coating layer 15 of the separator, a ratio of the weight of the heat-resistant organic particles 11 and the total weight of the organic heat-resistant binder 14 and the organic adhesive binder 13, that is, a weight ratio {heat-resistant organic particles:(organic heat-resistant binder+organic adhesive binder)}, may be 30:1 to 1:1, for example, 9:1 to 8:2. When the ratio of the weight of the heat-resistant organic particles 11 and the total weight of the organic heat-resistant binder 14 and the organic adhesive binder 13 is in the range stated above, the separator having excellent heat resistance and a good breakdown voltage characteristic may be manufactured.

The amount of the heat-resistant organic particles 11 may be 90 to 99 parts by weight, for example, 92 to 98 parts by weight based on a total weight of 100 parts by weight of the coating layer 15. When the amount of the heat-resistant organic particles 11 is in a range stated above, the separator having heat resistance and an improved breakdown voltage characteristic may be manufactured.

The heat-resistant organic particles experience substantially little thermal deformation at 150° C. or higher, have a small amount of moisture and are produced to have small diameters.

The heat-resistant organic particles may include, for example, a crosslinked polymer. When the crosslinked polymer is used as the heat-resistant organic particles, the heat resistance is improved, and thus shrinkage of a porous substrate at high temperatures can be effectively suppressed.

The crosslinked polymer may include, for example, a reaction product obtained through a crosslinking reaction of one or more polymerizable monomers selected from an acryl-based polymer, a methacryl-based polymer, polydial-lylphthalate, polyimide, polyurethane, and polystyrene, and a crosslinking agent. Herein, the reaction product may be is a crosslinked material, and the acryl-based polymer and the methacryl-based polymer may be collectively represented as a (meth)acryl-based polymer.

The (meth)acryl-based polymer may include, for example, a homopolymer or a copolymer obtained through a polymerization reaction of one or more (meth)acryl-based monomers selected from methyl (meth)acrylate, ethyl (meth)acrylate, propyl (meth)acrylate, isopropyl (meth) acrylate, n-butyl (meth)acrylate, sec-butyl (meth)acrylate, isobutyl (meth)acrylate, tert-butyl (meth)acrylate, cyclohexyl (meth)acrylate, and (meth)acrylamide. The (meth) acryl-based polymer may be a copolymer obtained by copolymerizing the (meth)acryl-based monomer and an aromatic vinyl monomer.

The polymerizable monomer may have a crosslinkable functional group. The crosslinkable functional group may include, for example, a hydroxy group, a glycidyl group, an amino group, an N-methylol group, a vinyl group, or the like.

Examples of the polymerizable monomer having a crosslinkable functional group may include hydroxyl esters of ethylenically unsaturated carboxylic acid, such as hydroxypropyl (meth)acrylate or hydroxyethyl (meth)acrylate, glycidyl esters of ethylenically unsaturated carboxylic acid such as glycidyl (meth)acrylate, amino esters of ethylenically unsaturated carboxylic acid, such as dimethyl amino ethyl (meth)acrylate, ethylenically unsaturated amides containing a methylol group, such as N-methylol(meth)acrylamide or N, N-dimethylol(meth)acrylamide, and monomers having two or more vinyl groups, such as ethylene di(meth)acrylate or divinylbenzene.

Examples of the crosslinked polymer may include crosslinked polymethyl (meth)acrylate, crosslinked polyethyl (meth)acrylate, crosslinked polybutyl(meth)acrylate, crosslinked polyisopropyl crosslinked poly(meth)acrylate, crosslinked poly-n-butyl (meth)acrylate, crosslinked poly-sec-butyl(meth)acrylate, crosslinked polyisobutyl (meth) acrylate, crosslinked poly-tert-butyl(meth)acrylate, crosslinked polycyclohexyl(meth)acrylate, crosslinked poly (meth)acrylamide, and crosslinked polystyrene.

The heat-resistant organic particles of the present disclosure may include, for example, a crosslinked (meth)acryl-based polymer or a crosslinked polystyrene.

Examples of the crosslinked (meth)acryl-based polymer may include a reaction product of a (meth)acryl-based monomer and a crosslinking agent. Examples of the (meth) acryl-based monomer may include one or more selected from C1-C20 alkyl (meth)acrylate, (meth)acrylate containing a hydroxy group, (meth)acrylate containing a C1-C20 hydroxyalkyl group, and (meth)acrylate containing a C1-C20 alkoxy group.

The crosslinked (meth)acryl-based polymer may include, for example, crosslinked polyalkyl(meth)acrylate, crosslinked poly(meth)acrylic acid, and the like. The crosslinked polyalkyl(meth)acrylate may include, for example, crosslinked polymethylmethacrylate, crosslinked polyethylmethacrylate, crosslinked polymethylacrylate, crosslinked polyethylacrylate, and the like.

In the present disclosure, the crosslinking agent is a compound having a crosslinkable functional group, and any compound generally used in the art may be used as the crosslinking agent. The crosslinking agent may include, for example, one or more selected from the group consisting of divinylbenzene, ethyleneglycoldimethacrylate, diethyleneglycoldimethacrylate, triethyleneglycoldimethacrylate, 1,3-butyleneglycoldimethacrylate, arylmethacrylate, and 1,3-butyleneglycoldiacrylate.

The amount of the crosslinking agent may be 5 to 95% by weight based on the total weight of the crosslinking agent and a monomer such as a (meth)acryl-based polymer reacting with the crosslinking agent.

The crosslinked polystyrene may be a crosslinking reaction product of the styrene-based monomer and the crosslinking agent. The same kind of crosslinking agent as that of the crosslinking agent used in preparing the crosslinked (meth)acryl-based polymer may be used. The amount of the crosslinking agent may be 5 to 95% by weight based on a total weight of the styrene-based monomer and the crosslinking agent.

According to another embodiment, the crosslinked polymer may be a reaction product (a crosslinked material) obtained through a crosslinking reaction of the polymerizable monomer having a crosslinkable functional group and the binder.

The crosslinkable functional group may also react with the organic bindable functional group of the binder to thus form a chemical bond. Any binder may be used so long as it can be generally used in the art. For example, a carbodiimide-based compound may be used as the binder. Examples of the carbodiimide-based compound may include, but not limited to, N,N'-di-o-tolylcarbodiimide, N,N'-dipethylcarbodiimide, N,N'-dioctyldecylcarbodiimide, N,N'-di-2,6-diketylphenylcarbodiimide, N-tolyl-N'cyclohexylcarbodiimide, N,N'-di-2,6-diisopropylphenylcarbodiimide, N,N'-di-2,6-di-tert-butylphenylcarbodiimide, N-tolyl-N'-phenylcarbodiimide, N,N'-di-p-nitrophenylcarbodiimide, N,N'-di-p-aminophenylcarbodiimide, N,N'-di-p-hydroxyphenylcarbodiimide, N,N'-di-cyclohexylcarbodiimide, N,N'-di-p-tolylcarbodiimide, p-phenylene-bis-di-o-tolylcarbodiimide, p-phenylene-bisdicyclohexylcarbodiimide, hexamethylene-bisdicyclohexylcarbodiimide, ethylene-bisdiphenylcarbodiimide, benzene-2,4-diisocyanato-1,3,5-tris(1-methylethyl) homopolymer, a copolymer of 2,4-diisocyanato-1,3,5-tris(1-methylethyl) and 2,6-diisopropyl diisocyanate, and a combination thereof, and any compound may be used so long as it can be used as the carbodiimide-based compound in the art.

According to an embodiment, the heat-resistant organic particles may be a compound having a core/shell structure. The core may include a crosslinking-type polymer having a thermal decomposition temperature of 150° C. or higher, and the shell may include a polymer having a thermal decomposition temperature of 130° C. or lower.

The amount of the shell is 30 to 90% by weight based on the total weight of the core and the shell. When the heat-resistant organic particles have a core/shell structure, the polymer in the shell part having a glass transition temperature of 130° C. or lower may be melted at a high temperature, for example, at 130° C. or higher, and the melted polymer of the shell may coat the separator, thereby functioning to impart a shutdown effect to the separator.

The crosslinking-type polymer forming the core, having a thermal decomposition temperature of 150° C. or higher, may include, for example, crosslinked polymethyl(meth) acrylate, crosslinked polyethyl(meth)acrylate, crosslinked polybutyl(meth)acrylate, crosslinked polyisopropyl poly (meth)acrylate, crosslinked poly-n-butyl (meth)acrylate, crosslinked polysec-butyl(meth)acrylate, crosslinked polyisobutyl (meth)acrylate, crosslinked polytert-butyl(meth) acrylate, crosslinked polycyclohexyl (meth)acrylate, crosslinked poly(meth)acrylamide, and crosslinked polystyrene.

The polymer forming the shell, having a glass transition temperature of 130° C. or lower, may include, for example, polypropylene (PP), polyethylene (PE), polystyrene (PS), polyvinylidene fluoride (PVDF), polymethylmethacrylate (PMMA), polyacrylonitrile (PAN), and a polymer of an azodicarbonamide-based compound.

A weight average molecular weight of the polymer forming the heat-resistant organic particles, the organic heat-resistant binder and the organic adhesive binder included in the coating layer of the separator is not particularly limited. The weight average molecular weight of the polymer may be in a range of, for example, 10,000 to 300,000

In the present disclosure, the organic heat-resistant binder may be a first organic material having a glass transition temperature of 130° C. to 200° C., and usable examples thereof may include one or more selected from the group consisting of polyvinylalcohol, polyvinylpyrrolidone, carboxymethylcellulose, polyamide, polyacrylic acid, and poly N-vinylacetamide (PNVA).

The organic adhesive binder may be a second organic material having a glass transition temperature of −40° C. or lower, for example, −80° C. to −40° C., −80° C. to −50° C., or −80° C. to −65° C. When the glass transition temperature of the organic heat-resistant binder and the organic adhesive binder is in the range stated above, the organic heat-resistant binder and the organic adhesive binder contained in the coating layer have a high binding force with respect to a porous substrate and demonstrate heat resistance.

The diameter of the organic adhesive binder nay be in a range of 0.1 to 0.3 μm like the heat-resistant organic particles, or smaller than that of the heat-resistant organic particles.

The organic adhesive binder may include, for example, one or more selected from the group consisting of polymethylmethacrylate, polybutylmethacrylate, polyethylmethacrylate, and poly 2-ethylhexylacrylate.

The mixing weight ratio of the organic heat-resistant binder and the organic adhesive binder may be 7:3 to 9:1, as stated above. When the amounts of the organic heat-resistant binder and the organic adhesive binder are in the ranges stated above, the coating layer has a high binding force with respect to the porous substrate and demonstrates improved heat resistance and an enhanced breakdown voltage characteristic.

In the separator according to an embodiment, a puncture strength of the porous substrate is greater than or equal to 250 gf, and a puncture strength per separator thickness is greater than or equal to 8 gf/mm.

A breakdown voltage characteristic range of the separator according to an embodiment is greater than or equal to 0.5 kV, for example, 1.4 to 1.8 kV. In addition, an elongation ratio in a transverse direction (TD) of the separator is 100% or greater, and an average thermal shrinkage rate in a longitudinal direction (MD) and in the transverse direction (TD) of the separator at 130° C. for 5 minutes is 5% or less, for example, 0.1 to 5%. As such, the separator according to an embodiment has a low thermal shrinkage rate at high temperature, and thus has improved thermal stability.

The coating layer is formed on at least one surface of the separator according to an embodiment, a thickness of the coating layer is 0.1 to 3.0 μm, and the coating layer of the separator has a density of 0.5 to 1 g/m$^2$. When the thickness of the coating layer satisfies the range stated above, the separator including the coating layer may provide improved adhesion and air permeability. Additionally, the thickness of an electrode assembly may be minimized, and thus the capacity per volume of the battery may be maximized.

For example, the coating layer may be disposed on one surface or both surfaces of the porous substrate.

In the separator according to an embodiment, the density of the coating layer may be smaller than that of a coating layer including an inorganic material (that is, greater than or equal to 1.4, or 1.7 g/m$^2$). Thus, by using the separator, a lithium secondary battery which is lighter in weight may be manufactured. In addition, the separator according to an embodiment may include an organic material alone, and thus may have reduced tortuosity and high ionic conductivity, thereby manufacturing a lithium secondary battery having improved cell performance by using the separator.

The porous substrate may be a porous layer including polyolefin. Polyolefin has an excellent short-circuit preventing effect, and can improve battery stability owing to a shutdown effect. The porous substrate may be a polymer layer including, for example, polyolefin such as polypropylene, polyethylene or polybutene, a mixture or copolymer thereof. A sheet made of, for example, a glass fiber, or a nonwoven fabric, may be used as the porous substrate. For example, the porous substrate may include polyolefin, such as polyethylene or polypropylene, and multiple layers of two or more layers may be used for the porous substrate. The porous substrate may include mixed multiple layers, and may be, for example, a 2-layer separator including polyethylene and polypropylene layers, a 3-layer separator including polyethylene, polypropylene and polyethylene layers, or a 3-layer separator including polypropylene, polyethylene and propylene layers. However, embodiments of the present disclosure are not limited thereto. Any suitable material and any suitable structure available for porous substrates in the related art may be used.

The porous substrate may have a pore diameter of 0.01 μm to 50 μm, for example, 0.01 μm to 20 μm, for example, 0.01 μm to 10 μm, a thickness of generally 5 μm to 300 μm, for example, 1 μm to 30 μm, for example, 3 μm to 20 μm, and a porosity of 5 to 95%. When the pore diameter, thickness and porosity of the porous substrate are in the ranges stated above, the separator may have excellent physical properties, and a lithium secondary battery including such a separator may have a small internal resistance.

According to another aspect, provided is a lithium secondary battery including: a positive electrode; a negative electrode; and the separator interposed therebetween. The lithium secondary battery may include a nonaqueous electrolyte.

Hereinafter, a process of manufacturing a lithium secondary battery employing the separator will be described, and specifically a manufacturing method of a lithium secondary battery including a positive electrode, a negative electrode, a nonaqueous electrolyte containing a lithium salt, and a separator, will be described.

The positive electrode and the negative electrode are manufactured by coating a positive electrode active material layer forming composition and a negative electrode active material layer forming composition on current collectors, respectively, followed by drying.

The positive electrode active material layer forming composition is prepared by mixing a positive electrode active material, a conductive agent, a binder and a solvent, and a lithium cobalt oxide according to an embodiment is used as the positive electrode active material.

The binder is an ingredient that may aid binding of an active material and a conductive agent and may aid binding to a current collector, and is added in an amount of 1 to 50 parts by weight, based on 100 parts by weight based on a total weight of the positive electrode active material. Non-limiting examples of the binder may include polyvinylidene fluoride, polyvinyl alcohol, carboxymethyl cellulose (CMC), starch, hydroxypropyl cellulose, reproduced cellulose, polyvinylpyrrolidone, tetrafluoroethylene, polyethylene, polypropylene, ethylene-propylene-diene terpolymer (EPDM), sulfonated EPDM, styrene-butylene rubber, fluorine rubber, and various copolymers.

Any conductive material may be used without particular limitation so long as it has conductivity while not causing a chemical change in the battery, and examples thereof may include: graphite such as natural graphite or artificial graphite; a carbonaceous material, such as carbon black, acetylene black, Ketjen black, channel black, furnace black, lamp black, or summer black; a conductive fiber such as a carbon fiber or a metal fiber; metal powder such as carbon fluoride powder, aluminum powder or nickel powder; a conductive whisker such as zinc oxide or potassium titanate; a conductive metal oxide such as titanium oxide; and a polyphenylene derivative.

Non-limiting examples of the solvent may include N-methyl pyrrolidone. The amounts of the conductive agent and the solvent may be commonly acceptable levels.

The positive electrode active material may include at least one selected from the group consisting of lithium cobalt oxide, lithium nickel cobalt manganese oxide, lithium nickel cobalt aluminum oxide, lithium iron phosphate, and lithium manganese oxide, but is not limited thereto. Any suitable positive electrode active material available in the art may be used. For example, the positive electrode active material may be any lithium-containing metal oxide without limitation so long as it is generally used in the art. For example, one or more of composite oxides a metal selected from cobalt (Co), manganese (Mn), nickel (Ni), or any combination thereof, and lithium may be used as the positive electrode active material, and specific examples thereof may include a compound represented by one of the following formulae: $Li_aA_{1-b}B_bD_2$ (wherein $0.90 \leq a \leq 1$ and $0 \leq b \leq 0.5$); $Li_aE_{1-b}B_bO_{2-c}D_c$ (wherein $0.90 \leq a \leq 1$, $0 \leq b \leq 0.5$, and $0 \leq c \leq 0.05$); $LiE_{2-b}B_bO_{4-c}D_c$ (wherein $0 \leq b \leq 0.5$ and $0 \leq c \leq 0.05$); $Li_aNi_{1-b-c}Co_bB_cD_\alpha$ (wherein $0.90 \leq a \leq 1$, $0 \leq b \leq 0.5$, $0 \leq c \leq 0.05$, and $0 < \alpha \leq 2$); $Li_aNi_{1-b-c}Co_bB_cO_{2-\alpha}F_\alpha$ (wherein $0.90 \leq a \leq 1$, $0 \leq b \leq 0.5$, $0 \leq c \leq 0.05$, and $0 < \alpha < 2$); $Li_aNi_{1-b-c}Co_bB_cO_{2-\alpha}F_2$ (wherein $0.90 \leq a \leq 1$, $0 \leq b \leq 0.5$, $0 \leq c \leq 0.05$, and $0 < \alpha < 2$); $Li_aNi_{1-b-c}Mn_bB_cD_\alpha$ (wherein $0.90 \leq a \leq 1$, $0 \leq b \leq 0.5$, $0 \leq c \leq 0.05$, and $0 < \alpha < 2$); $Li_aNi_{1-b-c}Mn_bB_cO_{2-\alpha}F_\alpha$ (wherein $0.90 \leq a \leq 1$, $0 \leq b \leq 0.5$, $0 \leq c \leq 0.05$, and $0 < \alpha < 2$); $Li_aNi_{1-b-c}Mn_bB_cO_{2-\alpha}F_2$ (wherein $0.90 \leq a \leq 1$, $0 \leq b \leq 0.5$, $0 \leq c \leq 0.05$, and $0 < \alpha < 2$); $Li_aNi_bE_cG_dO_2$ (wherein $0.90 \leq a \cdot 1$, $0 \leq b \leq 0.9$, $0 \leq c \leq 0.5$, and $0.001 \leq d \leq 0.1$); $Li_aNi_b Co_cMn_dGeO_2$ (wherein $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1$, and $0.001 \leq b \leq 0.1$); $Li_aCoG_bO_2$ (wherein $0.90 \leq a \leq 1$, and $0.001 \leq b \leq 0.1$); $Li_aMnG_bO_2$ (wherein $0.90 \leq a \leq 1$, and $0.001 \leq b \leq 0.1$); $Li_aMn_2G_bO_4$ (wherein $0.90 \leq a \leq 1$, and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); and $LiFePO_4$.

In the above formulae, A is Ni, Co, Mn, or a combination thereof; B is Al, Ni, Co, Mn, Cr, Fe, Mg, Sr, V, a rare earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

In some embodiments, the compound having a coating layer on its surface or a mixture of the compound and a compound having a coating layer may also be used. The coating layer may include an oxide of a coating element, a hydroxide of a coating element, an oxyhydroxide of a coating element, an oxycarbonate of a coating element, and a hydroxycarbonate of a coating element. The compounds included in the coating layer may be amorphous or crystalline. The coating element included in the coating layer may include Mg, Al, Co, K, Na, Ca, Si, Ti, V, Sn, Ge, Ga, B, As, Zr, or mixtures thereof. The coating layer may be formed using any suitable method (for example, a spray coating method, a dipping method, and/or the like), so long as it does not adversely affect the physical properties of the positive electrode active material. These methods should be apparent to those of ordinary skill in the art, and thus a detailed description thereof will not be provided herein.

For example, the positive electrode active material may be $LiNiO_2$, $LiCoO_2$, $LiMn_xO_{2x}$ (where x=1 or 2), $LiNi_{1-x}Mn_xO_2$ (where $0 < x < 1$), $LiNi_{1-x-y}Co_xMn_yO_2$ (where $0 \leq x \leq 0.5$ and $0 \leq y \leq 0.5$), $LiFeO_2$, $V_2O_5$, $TiS$, $MoS$, or the like.

A nickel cobalt manganese composite oxide having a high content of nickel may be used as the positive electrode active material according to an embodiment. The positive electrode active material may include, for example, $LiNi_{0.6}Co_{0.2}Mn_{0.2}O_2$, $LiNi_{0.7}Co_{0.3}Mn_{0.2}O_2$, and the like. As such, by using the nickel cobalt manganese composite oxide having a high content of nickel as the positive electrode active material, excellent capacity characteristics can be achieved.

Any positive electrode current collector having a thickness of 3 to 500 μm may be used without particular limitation so long as it has high conductivity while not causing a chemical change in the battery, and usable examples thereof may include stainless steel, aluminum, nickel, titanium, heat-treated carbon, and aluminum or stainless steel surface-treated with carbon, nickel, titanium or silver. The positive electrode current collector may be formed to have fine irregularities on its surface to enhance the adhesive strength of the positive electrode active material, and may be fabricated in various forms including films, sheets, foils, nets, porous structures, foams, and non-woven fabrics.

Separately from the above, a negative electrode active material, a binder, a conductive agent, and a solvent may be mixed to prepare the negative electrode active material layer forming composition. A material capable of intercalating and deintercalating lithium ions may be used as the negative electrode active material. Non-limiting examples of the material useful as the negative electrode active material may include a carbonaceous material such as graphite or carbon, a lithium metal, an alloy thereof, and a silicone oxide based material. According to an embodiment, a silicone oxide is used as the negative electrode active material.

According to another embodiment, the negative electrode may be a lithium metal electrode or a lithium metal alloy electrode. The negative electrode may include a lithium metal, and a metal/metalloid alloyable with the lithium metal or an oxide thereof. Examples of the metal/metalloid alloyable with the lithium metal or the oxide thereof may include Si, Sn, Al, Ge, Pb, Bi, Sb, Si—Y alloys (where Y is an alkali metal, an alkali earth metal, a Group 13 element, a Group 14 element, a transition metal, a rare earth element, or a combination thereof, and Y is not Si), an Sn—Y alloy (where Y is an alkali metal, an alkali earth metal, a Group 13 element, a Group 14 element, a transition metal, a rare earth element, or a combination thereof, and Y is not Sn), and MnOx (where $0 < x \leq 2$).

The element Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof. For example, the oxide of the metal/metalloid alloyable with the lithium metal may be lithium titanium oxide, vanadium oxide, lithium vanadium oxide, $SnO_2$, and $SiO_x$ (where $0 < x < 2$).

The negative electrode according to an embodiment may include a lithium metal or lithium metal alloy electrode; or one or more negative electrode active materials selected from a carbonaceous material, silicon, a silicon oxide, a silicon based alloy, a silicon-carbonaceous material composite, tin, a tin based alloy, a tin-carbon composite, and a metal oxide.

The same kind of material as that used in manufacturing the positive electrode may be used as each of the binder, conductive agent and the solvent. In addition, the amounts of the binder, the conductive agent and the solvent may be commonly acceptable levels.

The negative electrode current collector is generally formed to have a thickness of 3 to 500 μm. Any negative electrode current collector may be used without particular limitation so long as it has conductivity while not causing a chemical change in the battery, and usable examples thereof may include copper, stainless steel, aluminum, nickel, titanium, heat-treated carbon, copper or stainless steel surface-treated with carbon, nickel, titanium or silver, and an aluminum-cadmium alloy. In addition, like the positive electrode current collector, the negative electrode current collector may be formed to have fine irregularities on its surface to enhance the adhesive strength of the negative electrode active material, and may be fabricated in various forms including films, sheets, foils, nets, porous structures, foams, and non-woven fabrics.

The separator is interposed between the positive electrode and the negative electrode manufactured in the above-described manner.

The lithium secondary battery according to an embodiment includes a nonaqueous electrolyte. A non-aqueous electrolytic solution, an organic solid electrolyte, or inorganic solid electrolyte may be used as the nonaqueous electrolyte.

The nonaqueous electrolyte contains an organic solvent and a lithium salt.

Non-limiting examples of the usable organic solvent may include non-protic organic solvents, such as N-methyl-2-pyrrolidinone, propylene carbonate, ethylene carbonate, butylene carbonate, dimethyl carbonate, diethyl carbonate, gamma-butyrolactone, 1,2-dimethoxy ethane, 2-methyl tetrahydrofuran, dimethyl sulfoxide, 1,3-dioxolane, N,N-formamide, N,N-dimethyl formamide, dioxolane, acetonitrile, nitromethane, methyl formate, methyl acetate, phosphoric acid triester, trimethoxy methane, dioxolane derivative, sulforane, methyl sulforane, 1,3-dimethyl-2-imidazolidinone, a propylene carbonate derivative, a tetrahydrofuran derivative, ether, methyl propionate, and ethyl propionate.

Non-limiting examples of the usable organic solid electrolyte may include a polyethylene derivative, a polyethylene oxide derivative, a polypropylene oxide derivative, phosphoric acid ester polymer, polyvinyl alcohol, and polyvinylidene fluoride.

Non-limiting examples of the usable inorganic solid electrolyte may include $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a material that is readily soluble in the above-mentioned nonaqueous electrolyte and non-limiting examples thereof may include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, $(FSO_2)_2NLi$, lithium chloroborate, and lithium tetraphenyl borate.

Figure 2:
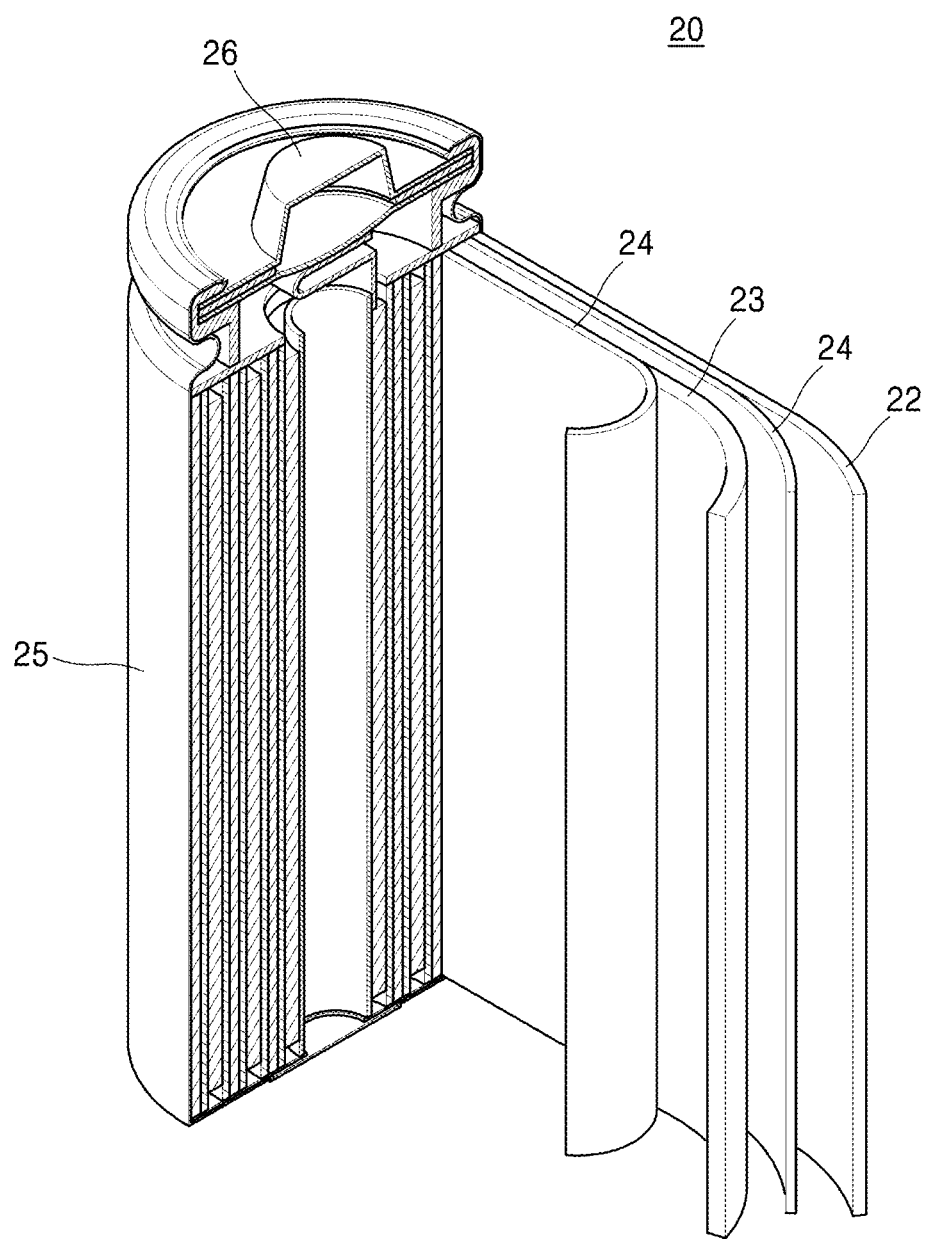
FIG. 2 schematically shows a structure of a lithium secondary battery including the separator according to an embodiment.

FIG. 2 schematically shows a structure of a lithium secondary battery 20 including the separator according to an embodiment.

Referring to FIG. 2, the lithium secondary battery 20 includes, as major components, a positive electrode 23, a negative electrode 22, and a separator 24 according to an embodiment disposed between the positive electrode 23 and the negative electrode 22, an electrolyte (not shown) impregnated in the positive electrode 23, the negative electrode 22 and the separator 24, a battery case 25, and a cap assembly 26 for sealing the battery case 25. The lithium secondary battery 20 may be constructed by sequentially stacking the positive electrode 23, the negative electrode 22 and the separator 24, winding the stacked structure and accommodating the wound structure in the battery case 25. The battery case 25 is sealed with the cap assembly 26, thereby completing the manufacture of the lithium secondary battery 20.

Hereinafter, the present disclosure will be described in detail with reference to the following examples, but these examples are not intended to limit the scope of the present disclosure.

Example 1

Crosslinked polymethylmethacrylate (PMMA) (Zeon Corporation, FIS) (carbonization temperature: 150° C.) as heat-resistant organic particles (average particle diameter: 200 nm), polyvinylpyrrolidone (PVP) as an organic heat-resistant binder, poly(2-ethylhexyl acrylate) as an organic adhesive binder, and water as a solvent, were mixed to prepare a composition for forming a coating layer. In the composition, a mixing weight ratio of PVP as the organic heat-resistant binder and poly(2-ethylhexylacrylate) as the organic adhesive binder was 7:3, and a mixing ratio of the weight of the heat-resistant organic particles and the total weight of the organic heat-resistant binder and the organic adhesive binder was about 30:1. The amount of solvent was about 28 parts by weight based on 100 parts by weight of the coating layer forming composition.

The coating layer forming composition was coated on both surfaces of an about 16 μm thick polyethylene film as a porous substrate and dried at 70° C. to manufacture a separator including a coating layer on both surfaces of the polyethylene film. The thickness of the coating layer was about 3 μm.

Example 2

A separator including a coating layer on both surfaces of a polyethylene film was manufactured in the same manner as in Example 1, except that the mixing weight ratio of PVP and poly(2-ethylhexylacrylate) was changed to 9:1.

Example 3

A separator including a coating layer on both surfaces of a polyethylene film was manufactured in the same manner as in Example 1, except that the mixing weight ratio of PVP and poly(2-ethylhexylacrylate) was changed to 5:1.

Example 4

A separator was manufactured in the same manner as in Example 1, except that the mixing ratio of the weight of the heat-resistant organic particles and the total weight of the organic heat-resistant binder and the organic adhesive binder was changed to 20:1, instead of about 30:1.

Comparative Example 1

A composition for forming a first coating layer was prepared by mixing crosslinked PMMA (Zeon Corporation) as heat-resistant organic particles, PVP as an organic heat-resistant binder and water as a solvent. The amount of solvent was about 70 parts by weight, the amount of crosslinked PMMA was 28 parts by weight, and the amount of PVP was 2 parts by weight, based on 100 parts by weight of the coating layer forming composition.

Separately from the above, a composition for forming a second coating layer was prepared by mixing crosslinked PMMA (Zeon Corporation) as heat-resistant organic particles and poly(2-ethylhexylacrylate) as an organic adhesive binder. The amount of solvent was about 70 parts by weight, the amount of crosslinked PMMA was 29 parts by weight, and the amount of poly(2-ethylhexylacrylate) was 1 part by weight, based on 100 parts by weight of the coating layer forming composition.

The first coating layer forming composition was coated on both surfaces of an about 16 μm thick polyethylene film as a porous substrate and dried at 70° C. to manufacture a separator including a first coating layer on both surfaces of the polyethylene film. The thickness of the first coating layer was about 1.5 μm. Subsequently, the second coating layer forming composition was coated on the separator having the first coating layer formed thereon and dried at 70° C. to manufacture a separator including a first coating layer and a second coating layer sequentially disposed on both surfaces of a polyethylene film.

Comparative Example 2

A separator having a coating layer disposed on both surfaces of a polyethylene film was manufactured in the same manner as in Example 1, except that a mixing weight ratio of PVP and poly(2-ethylhexylacrylate) in the coating layer forming composition was changed to 1:1.

Comparative Example 3

A separator having a coating layer disposed on both surfaces of a polyethylene film was manufactured in the same manner as in Example 1, except that a mixing weight ratio of PVP and poly(2-ethylhexylacrylate) in the coating layer forming composition was changed to 10:1.

Comparative Example 4

A coating layer forming composition was prepared by mixing 30 parts by weight of $SiO_2$ as an inorganic material and poly(2-ethylhexylacrylate) as an organic adhesive binder, and 70 parts by weight of water as a solvent. The amount of solvent was 70 parts by weight, the amount of $SiO_2$ as an inorganic material was 29 parts by weight, and the amount of poly(2-ethylhexylacrylate) was 1 part by weight, based on 100 parts by weight of the coating layer forming composition.

The coating layer forming composition was coated on both surfaces of an about 16 μm thick polyethylene film as a porous substrate and dried at 70° C. to manufacture a separator including a coating layer on both surfaces of the polyethylene film.

Manufacturing Example 1: Fabrication of Coin Cell

A uniformly dispersed slurry for forming a positive electrode active material layer was prepared by defoaming a mixture of 96 g of $LiNi_{0.6}Co_{0.2}Mn_{0.2}O_2$ as a positive electrode active material, 2 g of polyvinylidene fluoride, and 47 g of N-methyl pyrrolidone as a solvent, and 2 g of carbon black as a conductive agent using a mixer.

The prepared slurry was coated on an aluminum foil using a doctor blade to produce a thin electrode plate, dried at 135° C. for at least 3 hours, roll-pressed and vacuum-dried to prepare a positive electrode.

A porous polyethylene (PE) film (thickness: about 16 μm) was interposed between the positive electrode and a lithium metal counter electrode, and an electrolyte was injected into the resultant product, thereby fabricating a 2032 type coin cell.

A solution containing 1.1 M $LiPF_6$ dissolved in a solvent having ethylene carbonate (EC) and ethyl methyl carbonate (EMC) mixed in a volume ratio of 3:5 was used as the electrolyte.

Fabrication Examples 2-4: Fabrication of Coin Cells

Coin cells were fabricated in the same manner as in Manufacturing Example 1, except that the separators of Examples 2 to 4, instead of the separator of Example 1, were used.

Comparative Fabrication Examples 1 to 4: Fabrication of Coin Cells

Coin cells were fabricated in the same manner as in Manufacturing Example 1, except that the separators of Comparative Examples 2 to 4, instead of the separator of Example 1, were used.

Evaluation Example 1: Average Thermal Shrinkage Rate, Air Permeability, Puncture Strength Per Separator Thickness, and Breakdown Voltage Characteristic (1) Average Thermal Shrinkage Rate and Air Permeability Average thermal shrinkage rates of the separators prepared in Examples 1-4 and Comparative Examples 1-4 were evaluated by the following method. Each separator was heat-treated using an oven at 130° C. for 5 minutes and then taken out from the oven to be cooled at room temperature (25° C.). A specimen (size: 50 mm×50 mm) of each separator was stored in a convection oven under the condition of 130° C. and 60 minutes and then taken out from the convection oven. Then, shrinkage extents in MD and TD directions of each separator were measured at room temperature (25° C.) and the average thermal shrinkage rate was calculated. The calculation results of the shrinkage rates are summarized in Table 1 below.

In addition, the air-passing time of each of the separators prepared according to Examples 1-4 and Comparative Examples 1-4 was measured in the following manner, and the measurement results are listed in Table 1.

The air permeability was measured regarding how long it takes for the separator specimen to pass 100 cc of air (unit: second) with a constant pressure (0.05 MPa) using an air permeability tester (Maker: Asahi Seiko, Model: EG01-55-1MR). Data obtained from a total of three points, that is, left/middle/right points, of each sample, were averaged.

(2) Puncture Strength Per Thickness

To measure the puncture strength per thickness of each of the separators prepared according to Examples 1 to 4 and Comparative Examples 1 to 4, the following experiments were conducted.

Each of the separators prepared according to Examples 1-4 and Comparative Example 1-4 was cut into a size of 50 mm×50 mm (length (MD)×width (TD)) at 10 different regions, thereby obtaining 10 specimens. Then, each of the specimens is placed over a hole having a diameter of 10 cm using G5 equipment as a puncture strength tester (Gato Tech Co., Ltd), followed by measuring a puncturing force while pressing down using a probe having a diameter of 1 mm. The puncture strength of each specimen was measure three times, and then an average value of the measurement results was calculated. Data of the puncture strength per thickness of each separator are shown in Table 1

(3) Breakdown Voltage (BDV) Characteristic

Breakdown voltage characteristics of the separators prepared according to Example 1 and Comparative Example 1 were evaluated in the following manner, and the results are shown in Table 1.

The breakdown voltage characteristic of each separator was measured using TOS5301 equipment (available from KIKISUI) under the condition in which an increasing voltage from 0 to 2.54 kV was applied over 8 seconds at a constant current of 0.3 mA (AC mode) to each separator.

TABLE 1

| Data | Separator Shrinkage rate (%) at 130° C. | | Air permeability of separator | Puncture strength per thickness | BDV characteristic |
|---|---|---|---|---|---|
| | MD | TD | (sec/100 cc) | (gf/mm) | (kV) |
| Example 1 | 5 | 5 | 171 | 9.7 | 1.6 |
| Example 2 | 3 | 2 | 193 | 9.8 | 1.5 |
| Example 3 | 9 | 9 | 181 | 9.7 | 1.5 |
| Example 4 | 9 | 9 | 164 | 9.6 | 1.4 |
| Comparative Example 1 | 7 | 7 | 181 | 4.6 | 1.3 |
| Comparative Example 2 | 10 | 9 | 175 | 4.7 | 1.3 |
| Comparative Example 3 | 10 | 10 | 209 | 4.6 | 1.3 |
| Comparative Example 4 | 8 | 8 | 185 | 10.8 | 1.1 |

Referring to Table 1, the separators prepared according to Examples 1-4 showed reduced shrinkage rates at 130° C., compared to the separators prepared according to Comparative Examples 2-3, and thus the thermal stability and air permeability of each separator were improved. The separators according to Examples 1-4 had improved puncture strengths, compared to the separators according to Comparative Example 1-3. In addition, the separators according to Examples 1-4 had improved breakdown voltage characteristics, compared to the separators according to Comparative Examples 1-4. However, as shown in Table 1, the separator according to Comparative Example 1 showed a considerably reduced puncture strength while having good thermal stability and air permeability, compared to the separators according to Examples 1-4.

In addition, the separators according to Examples 1-4, in which organic particles were used in forming coating layers, had little impurity, such as iron, thereby suppressing battery deterioration, compared to the separator according to Comparative Example 4, in which the coating layer was formed using an inorganic material. By using the coating layer including an inorganic material, the separator according to Comparative Example 4 demonstrated excellent thermal stability and an enhanced shrinkage rate. Although the separator according to Comparative Example 4 demonstrated a high puncture strength due to characteristics of inorganic material, iron impurity contained during preparation of the inorganic material in forming the separator may act as foreign material of a cell, resulting in battery deterioration.

Evaluation Example 2: ICP Analysis

ICP analysis was conducted on the separators prepared in Example 1 and Comparative Example 4.

Ultima2 analyzer available from Horiba Jobin Yvon was used during the ICP analysis, iron contents were measured based on the ICP analysis results, and the results are shown in Table 2.

TABLE 2

| Data | Iron content (ppm) |
|---|---|
| Example 1 | 0.5 |
| Comparative Example 4 | 3 |

Referring to Table 2, the separator prepared according to Example 1 was found to have a reduced iron content, unlike the separator prepared according to Comparative Example 4.

Evaluation Example 3: Scanning Electron Microscope

Figure 3:
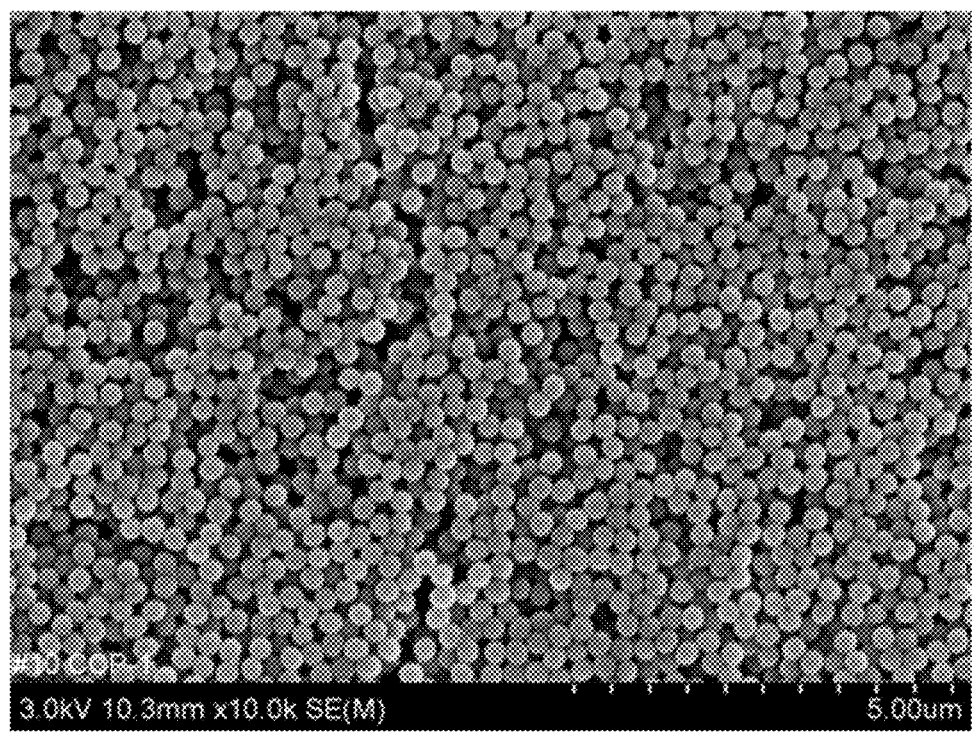
FIG. 3 is a scanning electron microscope (SEM) image illustrating a surface state of a separator manufactured according to Example 1.
Figure 4:
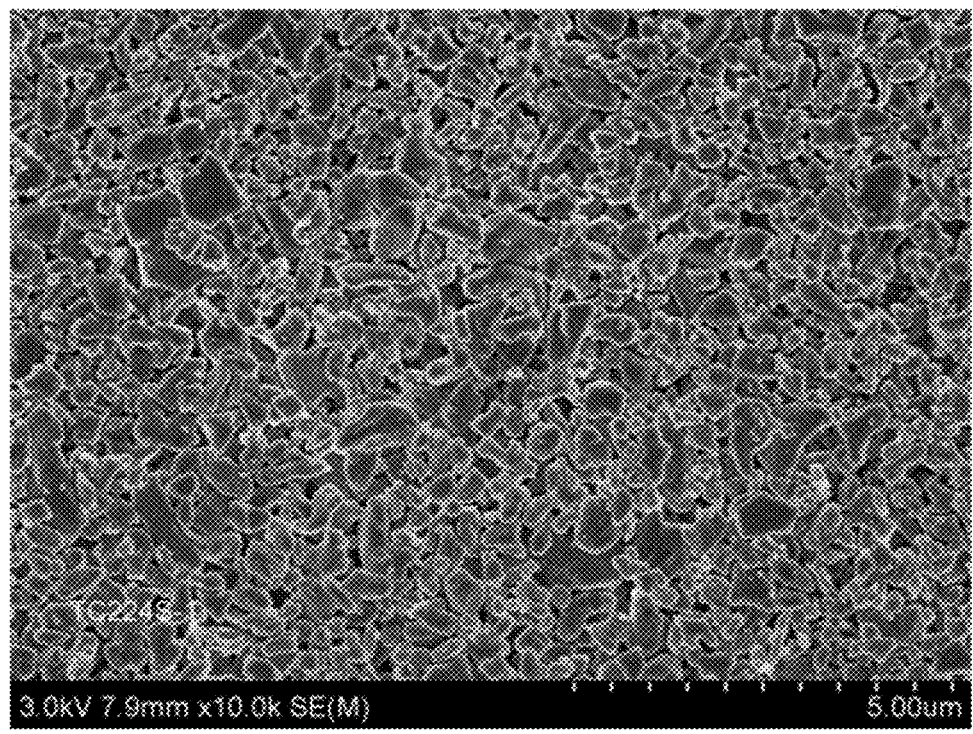
FIG. 4 is an SEM image illustrating a surface state of a separator manufactured according to Comparative Example 4.

The separators prepared according to Example 1 and Comparative Example 4 were analyzed using a scanning electron microscope, and the analysis results thereof are shown in FIGS. 3 and 4, respectively.

Referring to FIGS. 3 and 4, the coating layer of the separator according to Example 1 included heat-resistant organic particles having a uniform particle diameter. By contrast, the separator according to Comparative Example 4 had an inorganic material having non-uniform particle diameters.

While one or more example embodiments have been described with reference to the figures, the embodiments described herein have been presented by way of example only, and it will be appreciated by those skilled in the art that various changes and other equivalent embodiments may be made from the above description. Therefore, the present disclosure should be defined by the spirit and scope of the appended claims.

The invention claimed is:

1. A separator for a lithium secondary battery comprising:
a porous substrate; and
a coating layer disposed on both sides of the porous substrate,
wherein each coating layer contains heat-resistant organic particles, an organic heat-resistant binder, and an organic adhesive binder,
wherein the heat-resistant organic particles include a crosslinked polymer,
wherein the crosslinked polymer is crosslinked polymethyl(meth)acrylate,
wherein the organic heat-resistant binder is polyvinylpyrrolidone,
wherein the organic adhesive binder is poly 2-ethylhexylacrylate, and
wherein a mixing weight ratio of the organic heat-resistant binder and the organic adhesive binder is 7:3 to 9:1,
wherein a ratio of the weight of the heat-resistant organic particles and the total weight of the organic heat-resistant binder and the organic adhesive binder is 30:1 to 20:1,
wherein each coating layer has a thickness of 0.1 µm to 3 µm,
wherein the porous substrate comprises a polyethylene film having a thickness of 3 µm to 20 µm,
wherein an average particle diameter of the heat-resistant organic particles is 200 nm,
wherein a coating layer composition for forming the coating layer comprises 28 parts by weight of a solvent per 100 parts by weight of the coating layer composition, and
wherein the solvent is water.

2. The separator of claim 1, wherein the heat-resistant organic particles comprise a core/shell structure.

3. The separator of claim 1, wherein a puncture strength of the porous substrate is greater than or equal to 250 gf, a puncture strength per separator thickness is greater than or equal to 8 gf/mm, a breakdown voltage (BDV) of the separator is greater than or equal to 0.5 kV, an elongation ratio in a transverse direction (TD) of the separator is 100% or greater, and an average thermal shrinkage rate in a longitudinal direction (MD) and in the transverse direction (TD) of the separator at 130° C. for 5 minutes is 5% or less.

4. The separator of claim 1, wherein an iron content in the separator is 10 ppm or less.

5. The separator of claim 1, wherein each coating layer has a thickness of 0.1 μm to 3 μm, wherein the separator has a density of 0.5 g/m² to 1 g/m² and wherein the separator has an air permeability of 100 sec/100 cc to 400 sec/100 cc.

6. A lithium secondary battery comprising: a positive electrode, a negative electrode; and the separator of claim 1 interposed therebetween.

\* \* \* \* \*

UNITED STATES PATENT AND TRADEMARK OFFICE
CERTIFICATE OF CORRECTION

PATENT NO. : 12,212,017 B2
APPLICATION NO. : 16/969176
DATED : January 28, 2025
INVENTOR(S) : Jungyoon Lee It is certified that error appears in the above-identified patent and that said Letters Patent is hereby corrected as shown below:

In the Specification

In Column 9, Line 22, delete "(wherein $0.90 \leq a \cdot 1$," and insert --(wherein $0.90 \leq a \leq 1$,--.

Signed and Sealed this
Eighth Day of April, 2025

Coke Morgan Stewart
*Acting Director of the United States Patent and Trademark Office*